US012276137B2

(12) United States Patent
Wang et al.

(10) Patent No.: US 12,276,137 B2
(45) Date of Patent: *Apr. 15, 2025

(54) STEPLESS ADJUSTABLE ELECTRONIC DEVICE LOCKING APPARATUS

(71) Applicant: SINOX CO., LTD, New Taipei (TW)

(72) Inventors: Chia-Hung Wang, New Taipei (TW); Chia-Ming Wu, New Taipei (TW); Kuo-Kuang Pan, New Taipei (TW)

(73) Assignee: Sinox Co., Ltd, New Taipei (TW)

( * ) Notice: Subject to any disclaimer, the term of this patent is extended or adjusted under 35 U.S.C. 154(b) by 281 days.

This patent is subject to a terminal disclaimer.

(21) Appl. No.: 17/811,647

(22) Filed: Jul. 11, 2022

(65) Prior Publication Data

US 2023/0228129 A1 Jul. 20, 2023

(30) Foreign Application Priority Data

Jan. 18, 2022 (TW) ................................. 111102067

(51) Int. Cl.
*E05B 73/00* (2006.01)
*E05B 37/02* (2006.01)

(52) U.S. Cl.
CPC .......... *E05B 73/0082* (2013.01); *E05B 37/02* (2013.01)

(58) Field of Classification Search
CPC ... E05B 73/0082; E05B 37/02; E05B 73/0005
See application file for complete search history.

(56) References Cited

U.S. PATENT DOCUMENTS 8,833,117 B2 * 9/2014 Yang ..................... E05B 37/025 70/57
11,359,406 B2 * 6/2022 Su ....................... E05B 73/0082

FOREIGN PATENT DOCUMENTS

| | | | |
|---|---|---|---|
| CN | 207469955 U | 6/2018 |
| JP | 2021123936 A | 8/2021 |
| TW | M311742 U | 5/2007 |
| TW | M558837 U | 4/2018 |
| TW | M572919 U | 1/2019 |
| TW | M614260 U | 7/2021 |

* cited by examiner

*Primary Examiner* — Michael P Ferguson
*Assistant Examiner* — Thomas L Neubauer
(74) *Attorney, Agent, or Firm* — Rosenberg, Klein & Lee

(57) ABSTRACT

A stepless adjustable electronic device locking apparatus has a fixing member, a stage adjusting mechanism, a driving mechanism, an unlocking member, and a lock. The driving mechanism selectively opens the fixing member to engage in an anti-theft hole based on a current one of working stages to which the stage adjusting mechanism adjusts. The unlocking member is able to close the fixing member. By separating adjustment of the working stages and movement of the fixing member, the movements of the fixing member do not interfere in the working stages. Therefore, the unlocking member can be applied to the driving mechanism to unlock. The fixing member can be closed to disengage from the anti-theft hole through the unlocking member without being reversely rotated and adjusting the working stages, so as to unlocking quickly.

8 Claims, 9 Drawing Sheets

STEPLESS ADJUSTABLE ELECTRONIC DEVICE LOCKING APPARATUS

BACKGROUND OF THE INVENTION

1. Field of the Invention

The present invention relates to a locking apparatus for an electronic device, especially to a stepless adjustable locking apparatus for a laptop computer.

2. Description of the Prior Art(s)

A conventional electronic device, especially a portable electronic device such as a laptop computer, usually has an anti-theft hole that is used along with a specific lock such as a laptop lock, so as to lock the laptop computer at a specific location and prevent the laptop computer from being stolen.

Anti-theft holes of conventional laptop computers are available in at least three different sizes (widths). Accordingly, manufacturers also develop multi-stage adjustable locks that can be adjusted to a proper working stage, so as to be locked in the anti-theft hole of the conventional laptop computer.

A conventional multi-stage adjustable lock, regardless of stepped type (such as three-stage typed) or stepless type, is inserted into the anti-theft hole of the laptop computer with two hooks when in use, and then working stage of the conventional multi-stage adjustable lock is switched (such as by turning a knob) to pivot to open the two hooks to engage in the anti-theft hole. Afterwards, depending on type of the lock, by pulling out a key from a key lock or scrambling sequence of numbers of a combination lock, the two hooks are unable to be pivoted to be closed and leave the anti-theft hole.

However, when unlocking the conventional lock and inserting the key or arranging number in correct sequence, it needs to adjust the working stages reversely (such as rotating the knob in reverse direction) until the two hooks are pivoted to the smallest angle. In this way, the lock can be separated from the laptop computer, which is quite inconvenient to use.

Especially when the aforementioned structure is applied to a stepless adjustable lock, there are disadvantages as follows.

First, the stepless adjustable lock gradually opens the hooks by rotating the knob. Thus, if the anti-theft hole has larger width, it takes some time to rotate the knob a few turns to pivot to open the hooks to a desired degree. Consequently, it takes much time to relock the lock each time, which is quite inconvenient to use.

Second, how many turns to rotate the knob to lock, and then how many turns to rotate the knob in reverse direction to unlock. Therefore, it is quite time consuming to use.

Third, the stepless adjustable lock does not have fixed working stages. Therefore, every time when locking the lock, it is unable to ensure that the hooks can be opened to the same degree by rotating.

To overcome the shortcomings, the present invention provides a stepless adjustable electronic device locking apparatus to mitigate or obviate the aforementioned problems.

SUMMARY OF THE INVENTION

The main objective of the present invention is to provide a stepless adjustable electronic device locking apparatus that is configured to secure an electronic device with an anti-theft hole and has a fixing member, a stage adjusting mechanism, a driving mechanism, an unlocking member, and a lock. The fixing member is configured to be inserted in the anti-theft hole of the electronic device. The driving mechanism is connected with the fixing member and the stage adjusting mechanism, and selectively opens the fixing member to engage in the anti-theft hole based on a current one of working stages to which the stage adjusting mechanism adjusts. The unlocking member is connected to the driving mechanism and is movable to an unlocking position to close the fixing member, so as to make the fixing member disengage from the anti-theft hole. When the lock is locked, the stage adjusting mechanism is fixed at the current one of the working stages by the lock, and the unlocking member is incapable of being moved to the unlocking position.

The stepless adjustable electronic device locking apparatus of the present invention has the following advantages. In the present invention, adjustment of the working stages and movement of the fixing member are separate. In other words, the movements (opening or closing) of the fixing member do not interfere in the working stages to which the stage adjusting mechanism adjusts. Therefore, the unlocking member can be applied to driving mechanism to unlock. That is, the fixing member can be closed to disengage from the anti-theft hole through the unlocking member without being reversely rotated and adjusting the working stages, so as to unlocking quickly. In addition, since the working stage does not have to be changed when unlocking, the fixing member can be conveniently used to engage in the anti-theft hole of the same size directly in the future. The fixing member is inserted into the anti-theft hole of the same size directly and is opened with the same working stage. Thus, even the structure is for stepless adjustment, it can be kept at the same working stage. Lastly, since the working stage does not have to be adjusted again, even if the width of the anti-theft hole is larger, the working stage only has to be adjusted at the first use, which is convenient to use.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
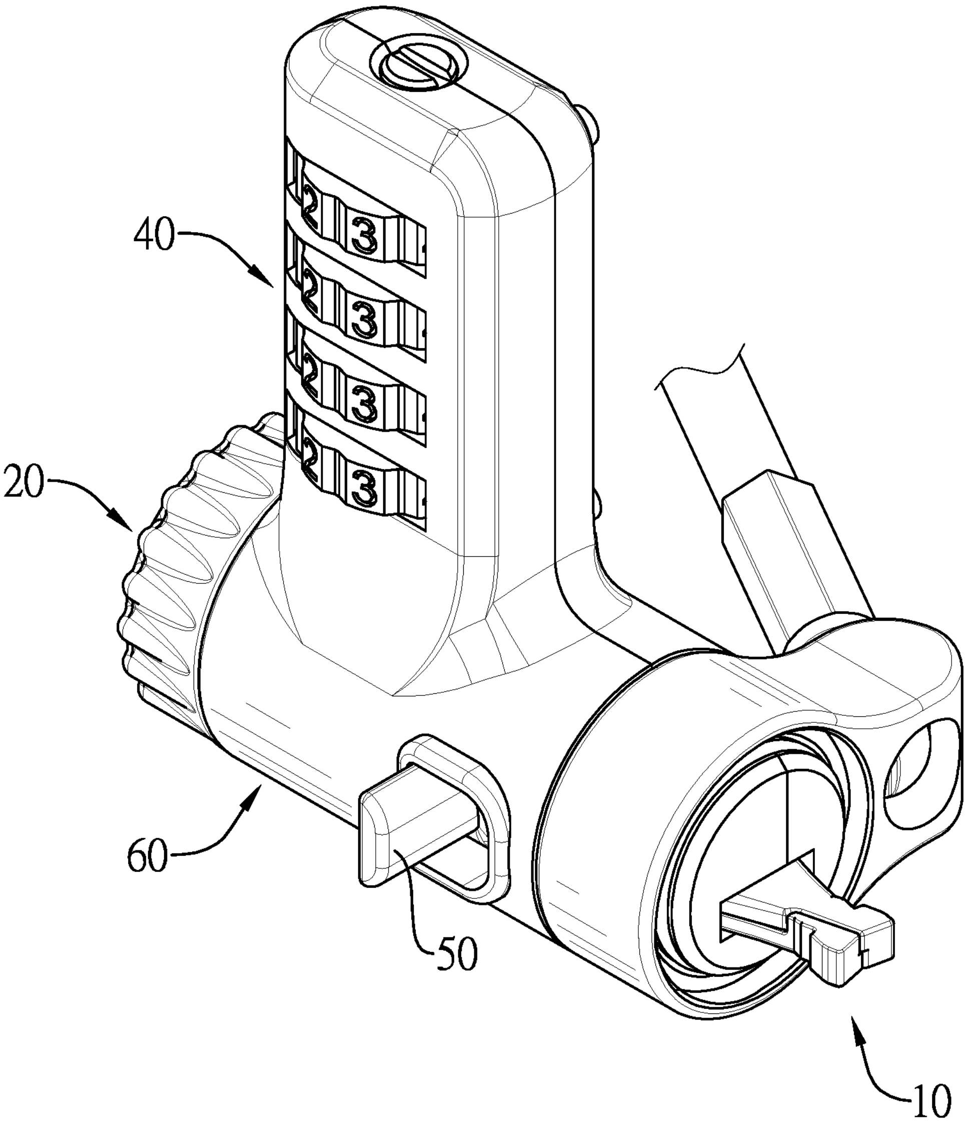
FIG. 1 is a perspective view of a first embodiment of a stepless adjustable electronic device locking apparatus in accordance with the present invention.
Figure 2:
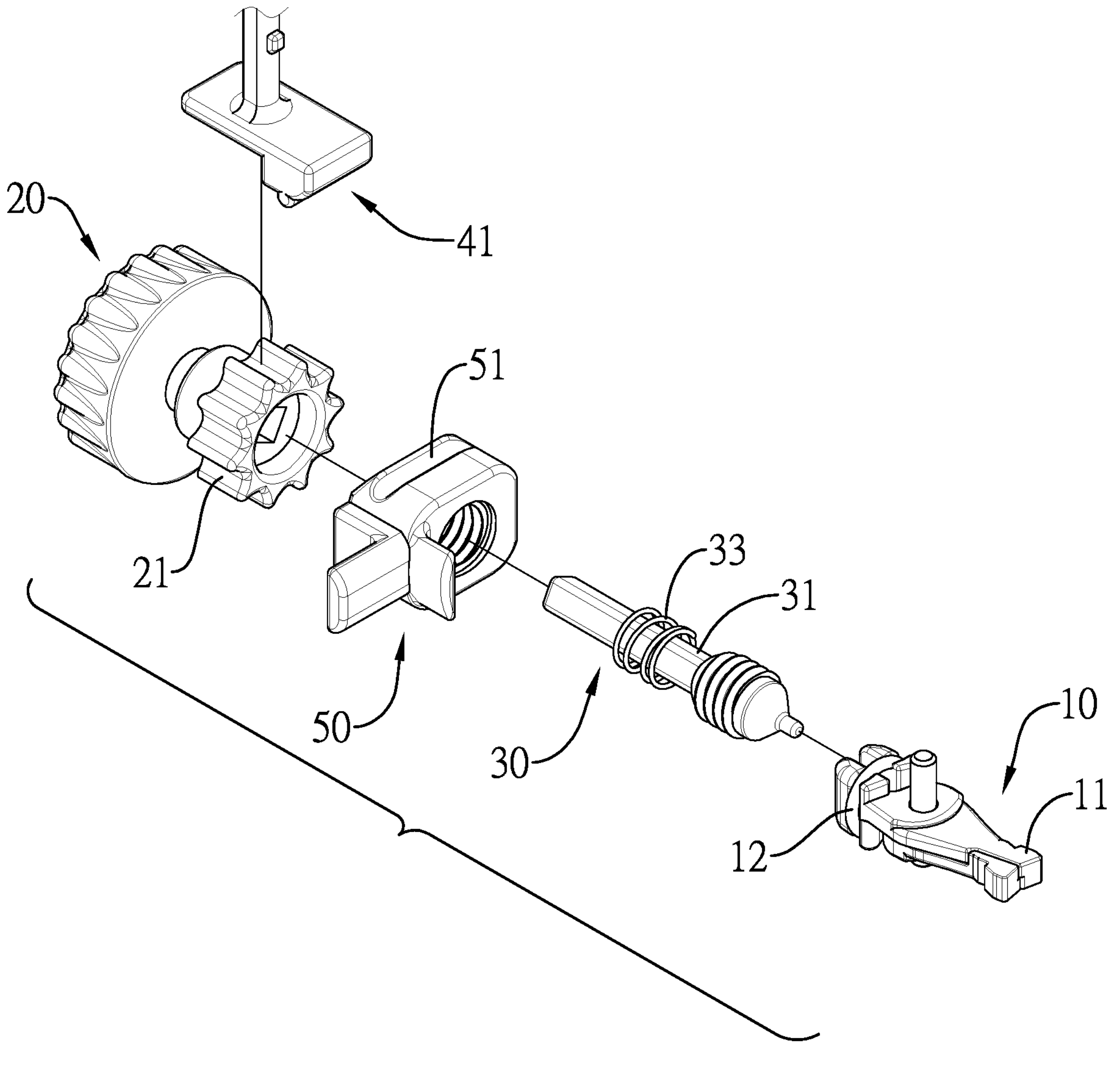
FIGS. 2 to 3 are partial exploded perspective views of the first embodiment of the stepless adjustable electronic device locking apparatus in FIG. 1.
Figure 3:
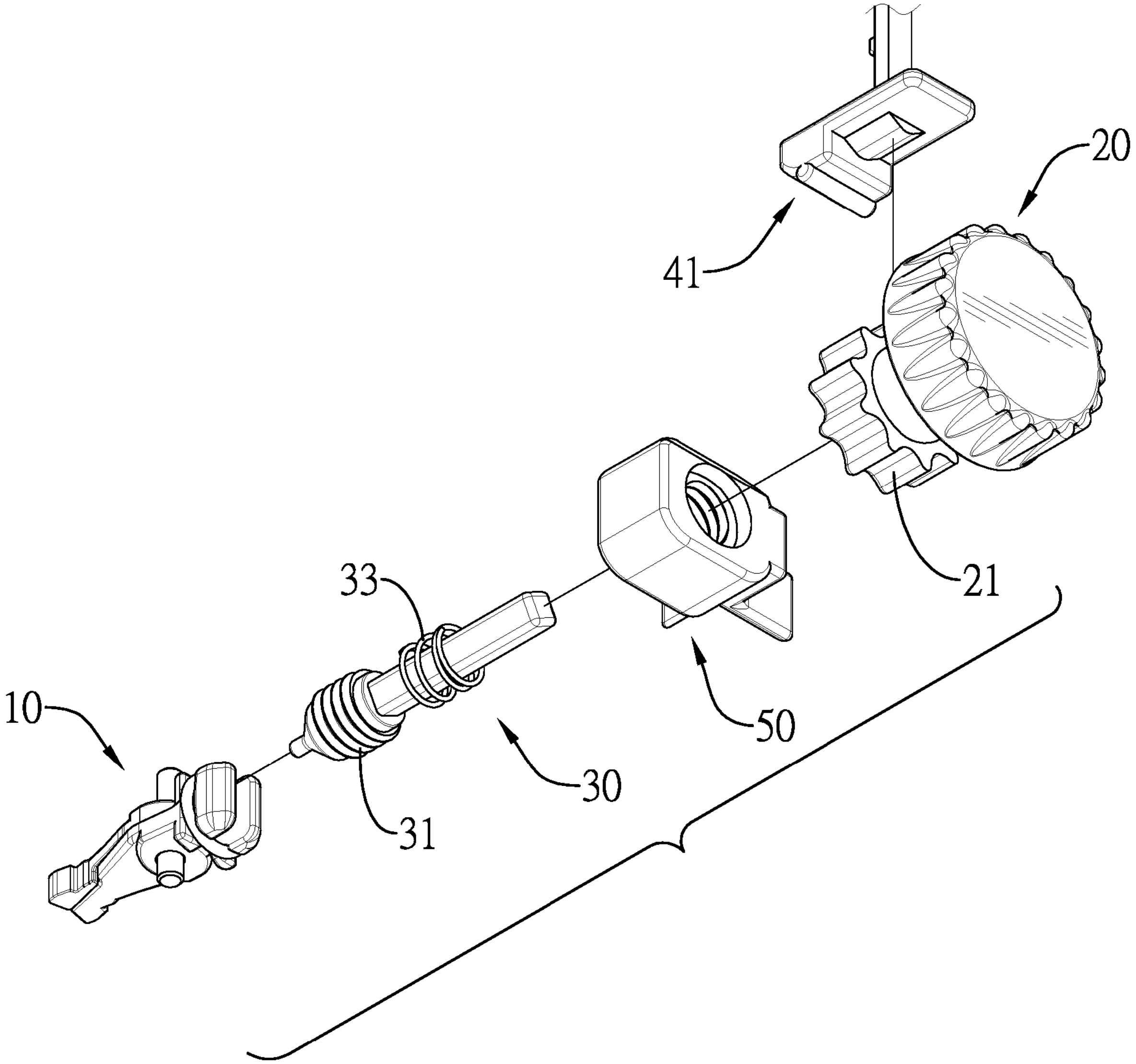

With reference to FIGS. 1 to 3, a stepless adjustable electronic device locking apparatus is configured to secure an electronic device. The electronic device has an anti-theft hole. A first embodiment of the stepless adjustable electronic device locking apparatus comprises a fixing member 10, a stage adjusting mechanism 20, a driving mechanism 30, an unlocking member 50, and a lock 40. The electronic device is preferably a portable electronic device, and specifically may be, but is not limited to, a laptop computer.

Figure 4:
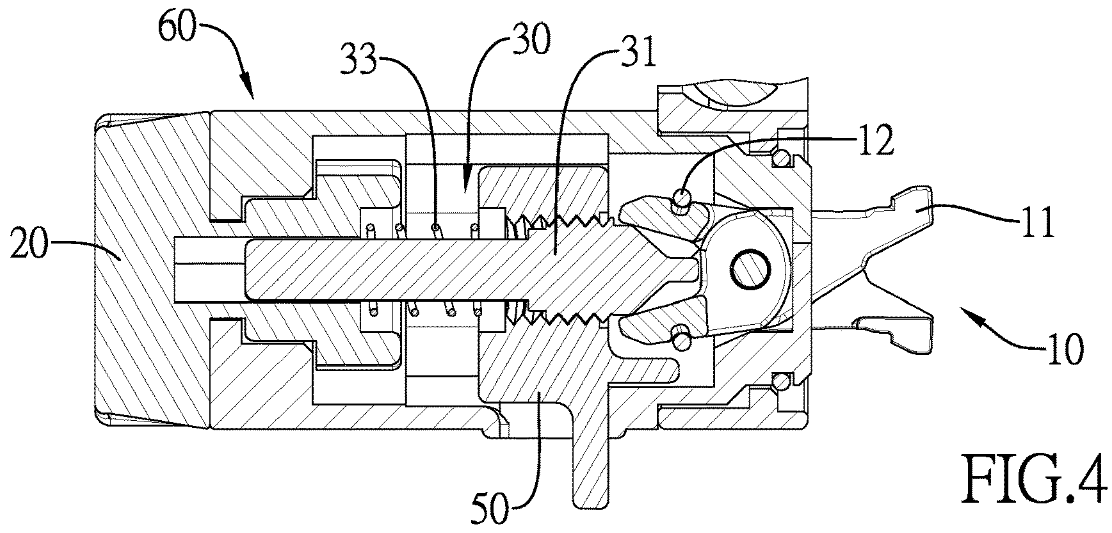
FIGS. 4 to 6 are operational cross-sectional top views of the first embodiment of the stepless adjustable electronic device locking apparatus in FIG. 1.

With reference to FIGS. 2 to 4, the fixing member 10 is configured to be inserted into the anti-theft hole of the electronic device. In the preferred embodiments, the fixing member 10 includes two hooks 11 and a hook resilient element 12. The two hooks 11 are pivotally connected with each other. The hook resilient element 12 connects the two hooks 11, so as to pivot to open or close the two hooks 11 in a normal state. However, a structure of the fixing member 10 is not limited to the structure as described above.

Figure 5:
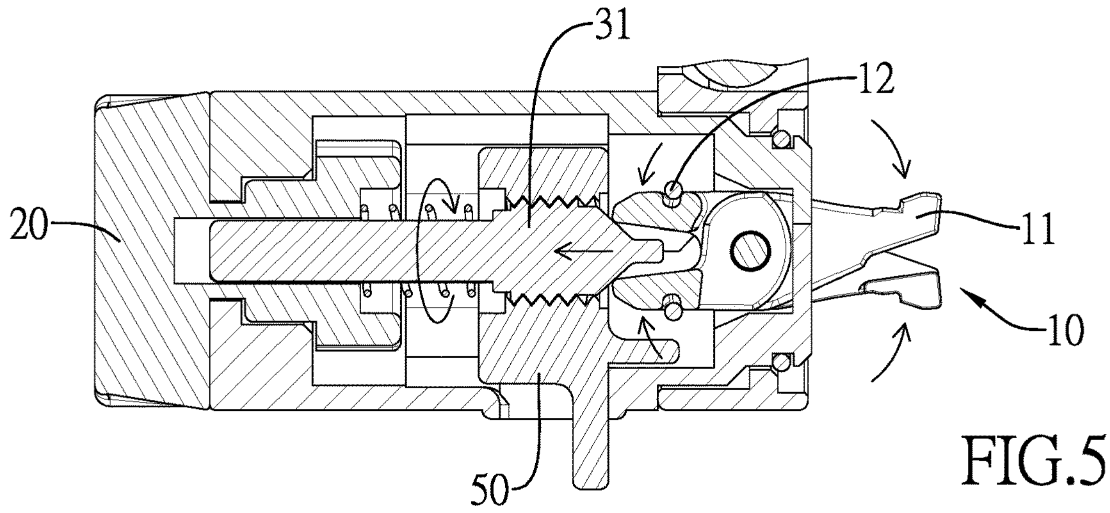

With reference to FIGS. 2 to 5, the stage adjusting mechanism 20 is configured to adjust the electronic device locking apparatus to multiple working stages in stepless form. The fixing member 10 may be opened to different degrees (as shown in FIGS. 4 and 5), such that the fixing member 10 is available for engaging in the anti-theft holes of different sizes. Preferably, the stage adjusting mechanism 20 may be a knob and is disposed on an end, which is defined on an axial direction of a housing 60. However, the structure of the stage adjusting mechanism 20 is not limited to the structure as described above and may be radially exposed to, but not necessarily protrudes to, an outside of the housing 60 from a side surface of the housing 60.

The driving mechanism 30 is connected with the fixing member 10 and the stage adjusting mechanism 20 and selectively opens the fixing member 10 to engage in the anti-theft hole based on a current one of the working stages to which the stage adjusting mechanism 20 adjusts. Preferably, the driving mechanism 30 includes a central shaft 31. The central shaft 31 is not limited to be shaped into a thin rod and may also be in various shapes such as cylinder. The central shaft 31 tends to move toward the fixing member 10. Specifically, the driving mechanism 30 further includes a central shaft resilient element 33 pushing the central shaft 31. The central shaft 31 moves toward the fixing member 10 to open the fixing member 10 to engage in the anti-theft hole based on the current one of the working stages to which the stage adjusting mechanism 20 adjusts. The central shaft 31 may move to directly push and open the fixing member 10, or the central shaft 31 may push and open the fixing member 10 indirectly via other components. Preferably, the hook resilient element 12 of the fixing member 10 makes inner ends of the two hooks 11, which are pivotally connected with each other, to be pivoted to be closed and outer ends of the two hooks 11 to be pivoted to be closed in the normal state. Thus, when the central shaft 31 is closer to the inner ends of the two hooks 11 of the fixing member 10, the inner ends of the two hooks 11 are propped further apart and the outer ends of the hooks 11 are also propped further apart.

Figure 6:
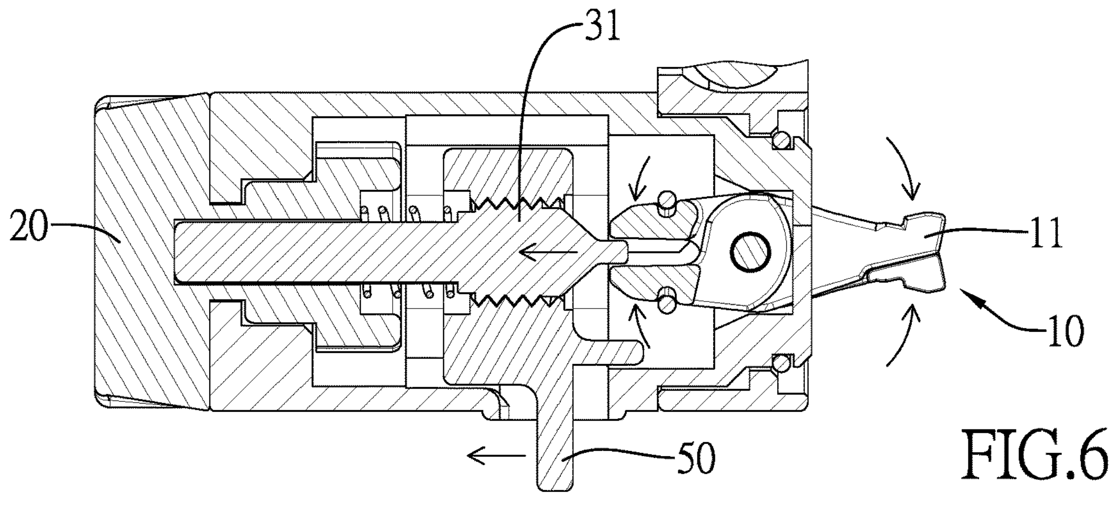

With reference to FIGS. 2, 5 and 6, the unlocking member 50 is connected to the driving mechanism 30 and is movable to an unlocking position to close the fixing member 10 so as to make the fixing member 10 disengage from the anti-theft hole. Preferably, the unlocking member 50 is connected with the central shaft 31. When the unlocking member 50 is moved to the unlocking position, the unlocking member 50 drives the central shaft 31 to move away from the fixing member 10. For the time being, the central shaft 31 would completely leave the inner ends of the two hooks 11, or not completely leave but not prop the inner ends of the two hooks 11. The hook resilient element 12 would cause the inner ends and the outer ends of the two hooks 11 to be pivoted to be closed. Preferably, moving directions of the unlocking member 50 and the central shaft 31 are parallel, and the unlocking member 50 directly pulls the central shaft 31. However, the relationship between the unlocking member 50 and the central shaft 31 is not limited to form as described above, and the moving directions of the unlocking member 50 and the central shaft 31 may not be parallel.

Furthermore, the unlocking member 50 has a threaded hole. The central shaft 31 is mounted through and screwed in the threaded hole. The unlocking member 50 and the central shaft 31 drive each other to move via threads (as shown in FIGS. 5 and 6) and the stage adjusting mechanism 20 drives the central shaft 31 to rotate relative to the unlocking member 50. Specifically, the stage adjusting mechanism 20 is connected to the central shaft 31, such that a user is able to rotate the central shaft 31 through operating (such as rotating) the stage adjusting mechanism 20. When the central shaft 31 has rotated relative to the unlocking member 50 through the threads, an axial position of the central shaft 31 (i.e. a position relative to the unlocking member 50, as shown in FIGS. 4 and 5) is changed and an opening degree of the fixing member 10 (the two hooks 11) is changed accordingly.

Figure 7:
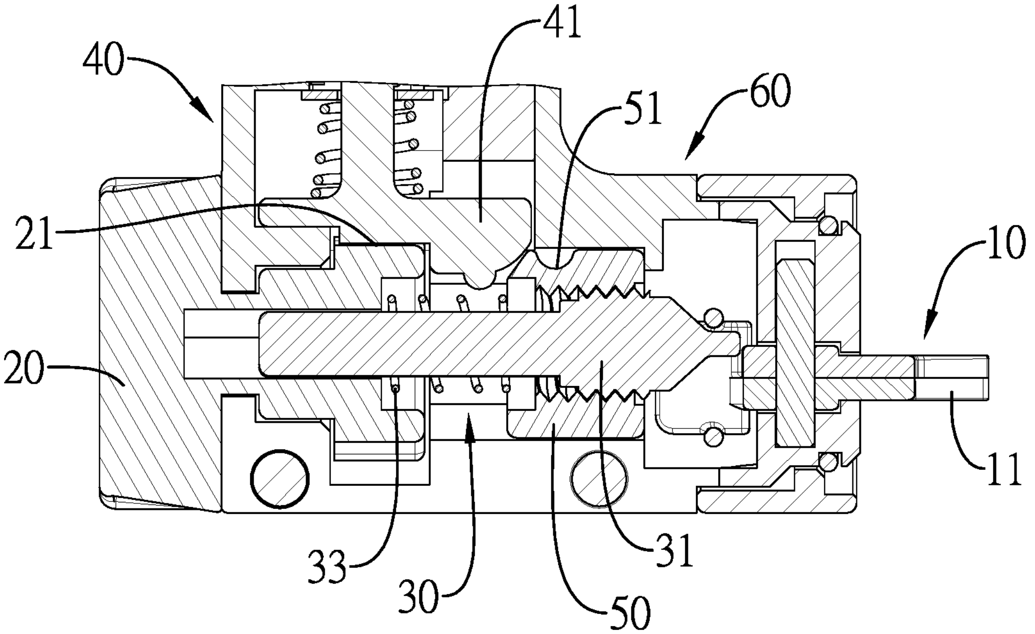
FIGS. 7 to 8 are operational cross-sectional side views of the first embodiment of the stepless adjustable electronic device locking apparatus in FIG. 1.
Figure 8:
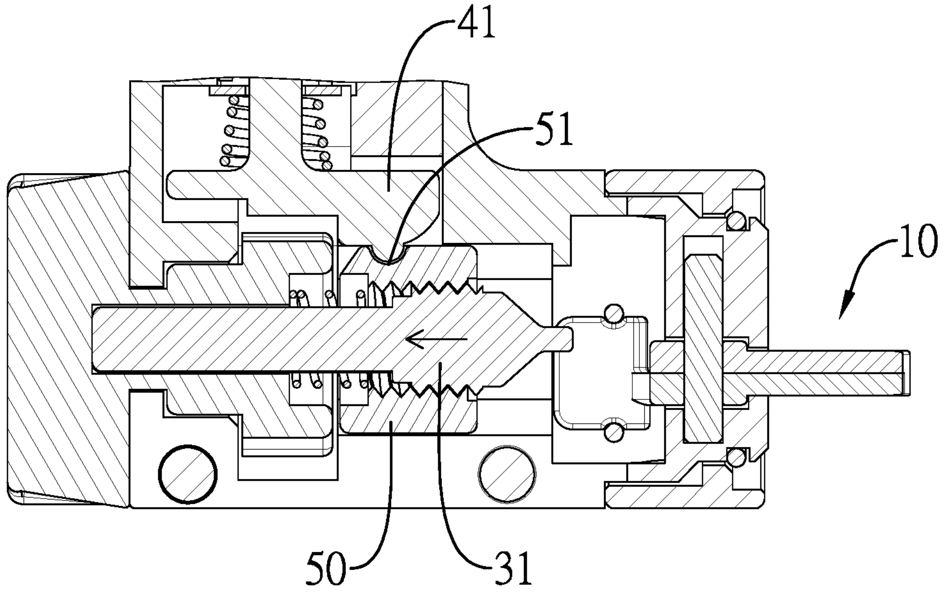
Figure 9:
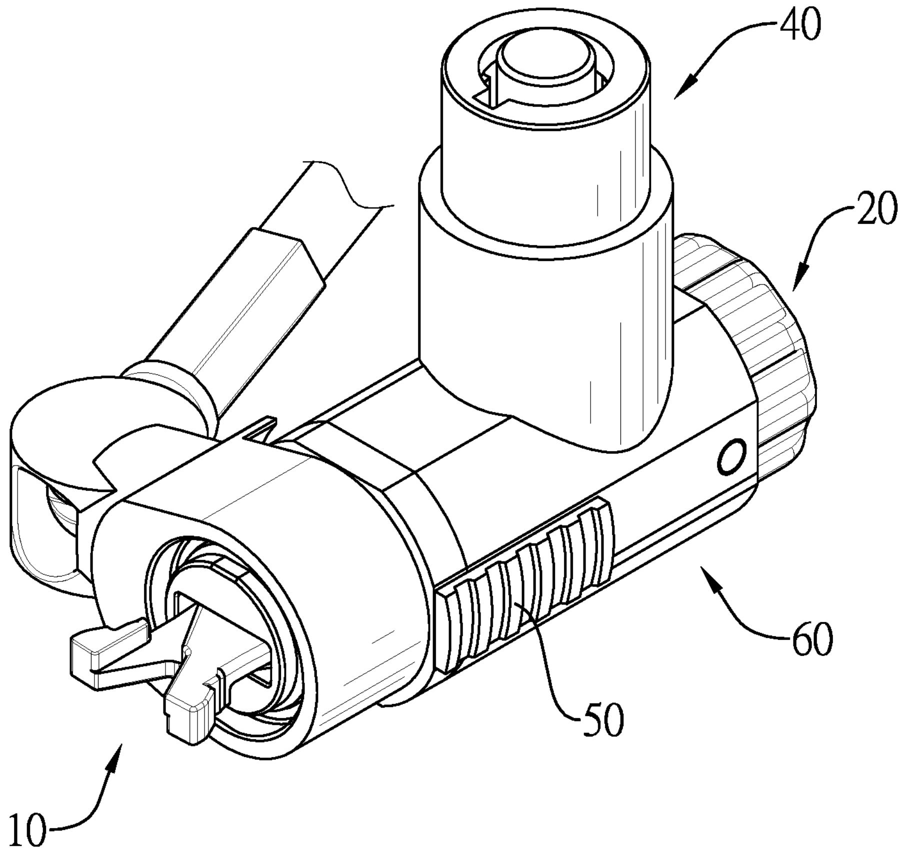
FIG. 9 is a perspective view of a second embodiment of a stepless adjustable electronic device locking apparatus in accordance with the present invention.
Figure 10:
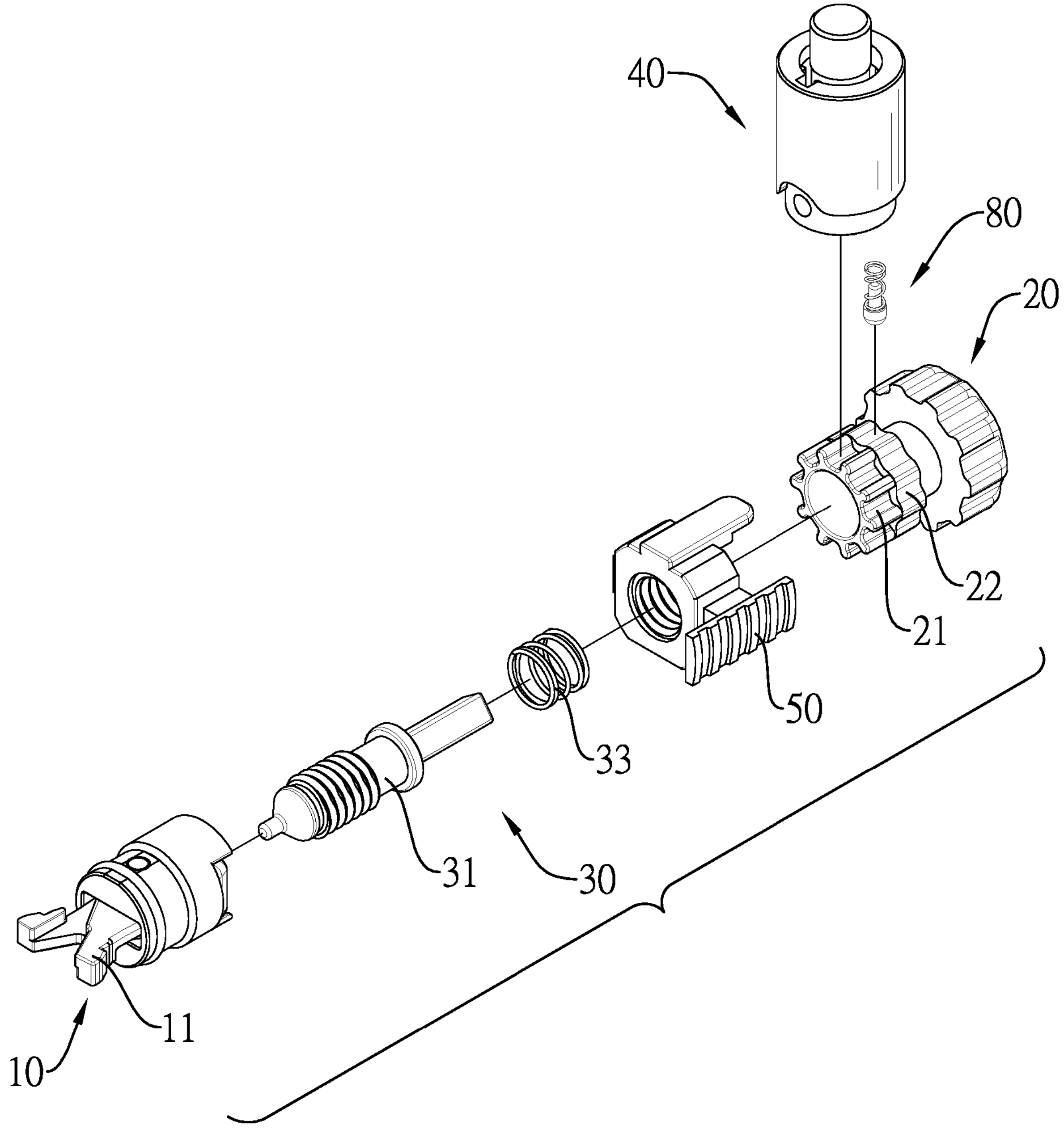
FIGS. 10 to 11 are partial exploded perspective views of the second embodiment of the stepless adjustable electronic device locking apparatus in FIG. 9.
Figure 11:
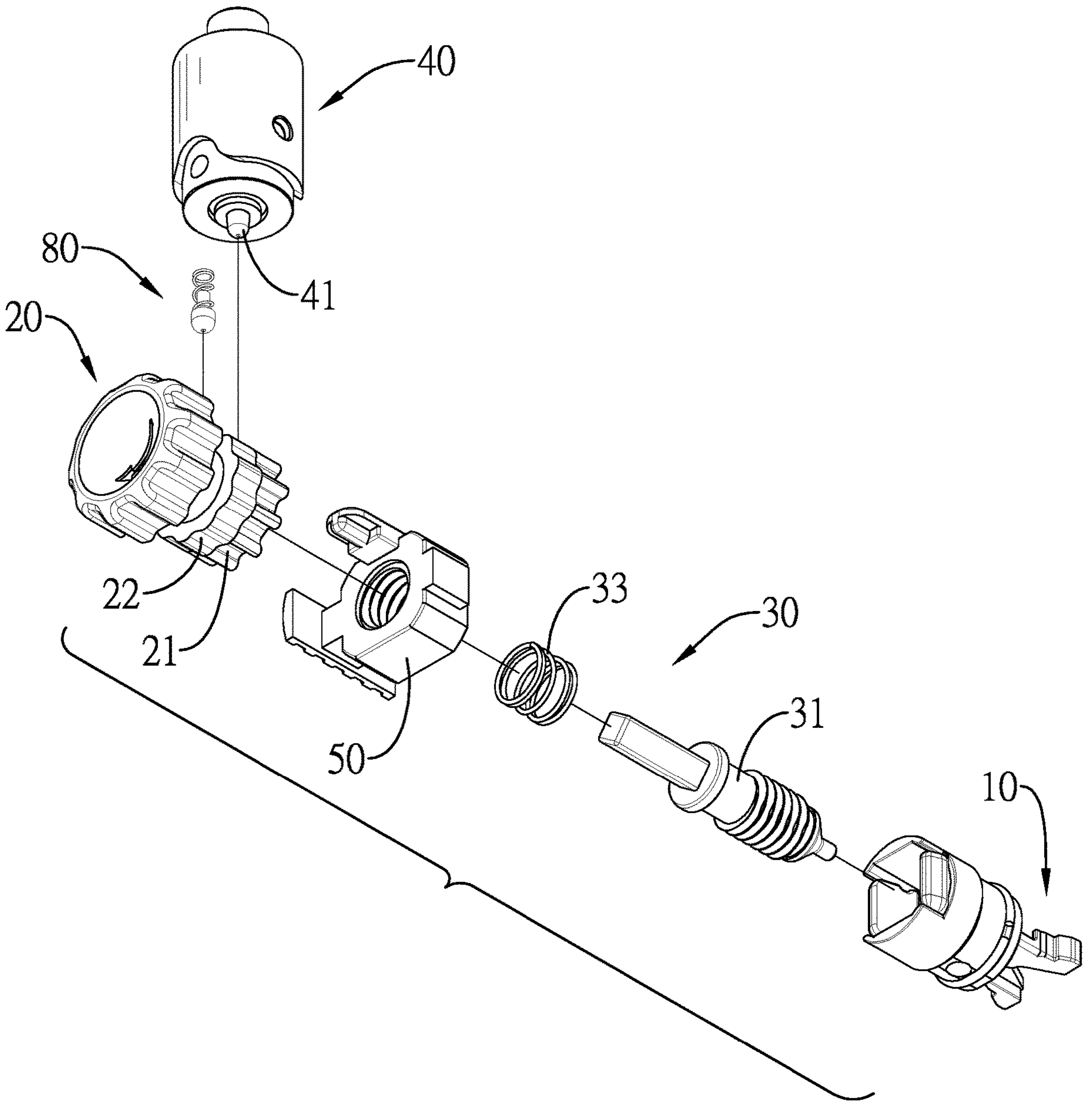
Figure 12:
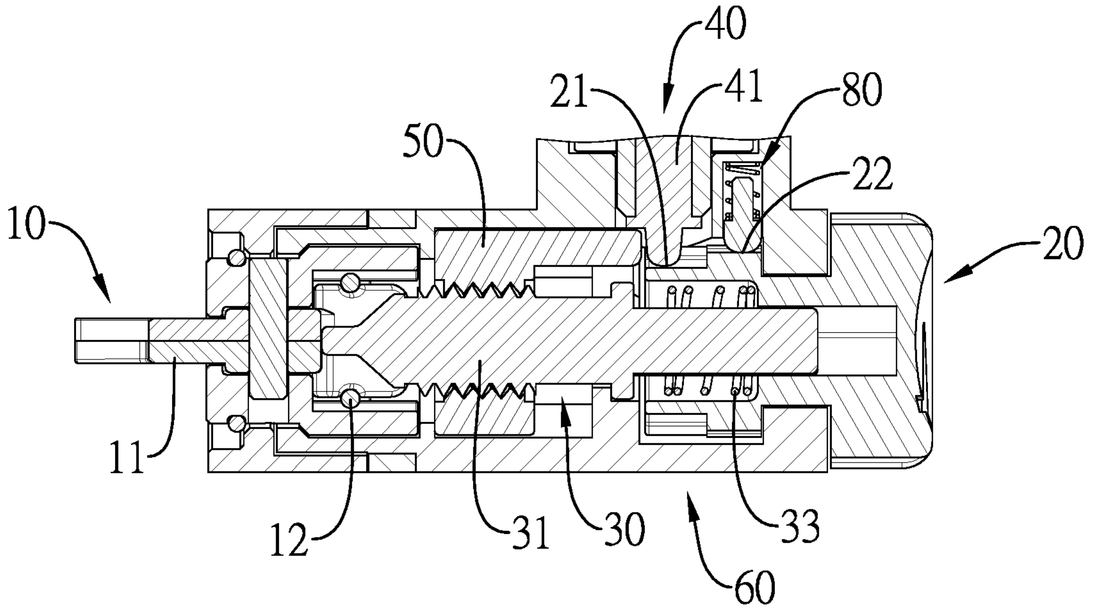
FIGS. 12 to 13 are operational cross-sectional side views of the second embodiment of the stepless adjustable electronic device locking apparatus in FIG. 9.
Figure 13:
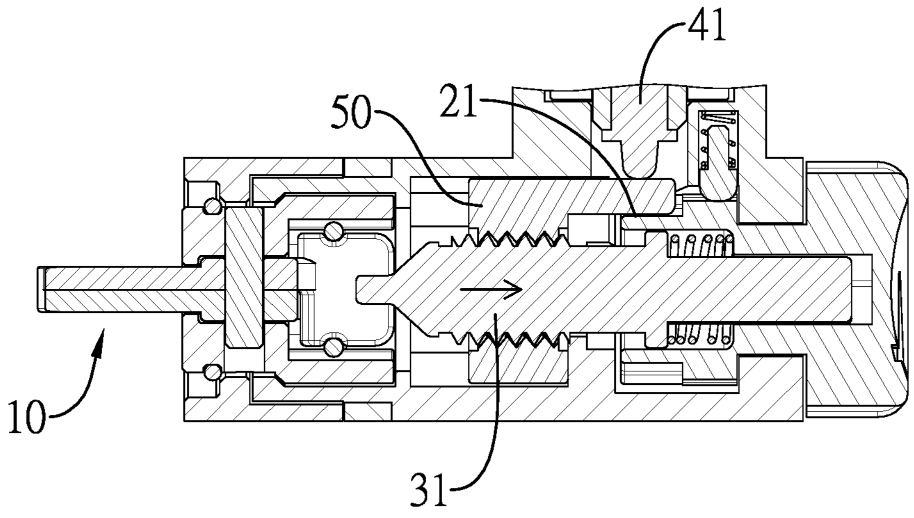

With reference to FIGS. 3, 7 and 8, when the lock 40 is locked, the stage adjusting mechanism 20 is fixed at the current one of the working stages by the lock 40 directly or indirectly, such that the unlocking member 50 is unable to be moved to the unlocking position. That is, the fixing member 10 is unable to be switched to other working stages or be closed. Preferably, the lock 40 has a retractable engaging member 41 (such as a locking bar) abutting against the unlocking member 50 (or the central shaft 31). When the lock 40 is locked, the engaging member 41 is non-retractable, so as to prevent the unlocking member 50 from being moved to the unlocking position. Accordingly, the central shaft 31 is unable to move away from the fixing member 10, such that the fixing member 10 is unable to be closed. Specifically, when the engaging member 41 is non-retractable, whether the engaging member 41 abuts against the unlocking member 50 or abuts against the central shaft 31, the engaging member 41 is able to stop the central shaft 31 and the unlocking member 50 from moving.

Preferably, when the unlocking member 50 is located at the unlocking position and the lock 40 is locked, the unlocking member 50 is fixed at the unlocking position by the lock 40. Specifically, when the unlocking member 50 is located at the unlocking position, the engaging member 41 engages in a back engaging recess 51 of the unlocking member 50 (or the central shaft 31) as shown in FIG. 8. For the time being, if the lock 40 is switched to a locking state to prevent the engaging member 41 from being retracted, the unlocking member 50 is fixed at the unlocking position and the central shaft 31 is kept away from the fixing member 10, such that the fixing member 10 is kept being closed. Whether the engaging member 41 engages with the unlocking member 50 or the central shaft 31, the engaging member 41 is able to fix the unlocking member 50 and the central shaft 31 at the same time.

Moreover, the stage adjusting mechanism 20 (or the central shaft 31) includes multiple rotating-stopping portions 21. The engaging member 41 of the lock 40 tends to engage with one of the rotating-stopping portions 21. When the lock 40 is locked, the engaging member 41 that is non-retractable prevents the stage adjusting mechanism 20 and the central shaft 31 from rotating, causing the working stages of the fixing member 10 unable to be changed.

In addition, when the lock 40 is unlocked and the engaging member 41 is retractable, the stage adjusting mechanism 20 and the central shaft 31 are able to rotate continuously, and the engaging member 41 would continue to move up and down during rotations of the stage adjusting mechanism 20 and the central shaft 31. When the user releases the stage adjusting mechanism 20 and the central shaft 31, the engaging member 41 abuts against the rotating-stopping portion 21 to fix the central shaft 31 at a specific rotation angle, such that the stepless adjustable electronic device locking apparatus of the present invention can be adjusted in a way similar to stepped.

With reference to FIGS. 4 to 6, in the present invention, adjustment of the working stages (i.e. the stage adjusting mechanism 20 driving the central shaft 31 to rotate relative to the unlocking member 50 through the threads to change the position of the central shaft 31) and movement of the fixing member 10 (i.e. the central shaft 31 pushing the fixing member 10 and the unlocking member 50 pulling the central shaft 31 back) are separate. In other words, the movement (opening or closing) of the fixing member 10 does not interfere with the working stages. That is, when the unlocking member 50 pulls the central shaft 31 back, the current rotation angle of the central shaft 31 is not interfered. Therefore, the fixing member 10 can be closed to disengage from the anti-theft hole through the unlocking member 50 without being reversely rotated and adjusting the working stages, so as to unlock quickly.

In addition, since the working stage does not have to be changed when unlocking, the fixing member 10 can be used to engage in the anti-theft hole of the same size directly. The fixing member 10 is inserted into the anti-theft hole of the same size directly (by releasing the unlocking member 50 to make the central shaft resilient element 33 to push the central shaft 31 back to push the two hooks 11) and is opened with the same working stage (without changing the angle of the central shaft 31). Thus, even the structure is for stepless adjustment, it can be kept at the same working stage. Lastly, since the working stage does not have to be adjusted again, even if the width of the anti-theft hole is larger, the working stage only has to be adjusted at the first use, which is convenient to use.

With reference to FIGS. 9 to 13, a second embodiment of the stepless adjustable electronic device locking apparatus is shown and is similar to the first embodiment. The main differences therebetween are as follows.

First, the lock 40 in the first embodiment is a combination lock and the lock 40 in the second embodiment is a key lock.

Second, in the first embodiment, the engaging member 41 of the lock stops the unlocking member 50 (or the central shaft 31) from moving away from the fixing member 10 and stops the stage adjusting mechanism 20 (or the central shaft 31) from rotating with two different parts. However, in the second embodiment, with reference to FIGS. 10 to 12, the engaging member 41 of the lock 40 stops the unlocking member 50 (or the central shaft 31) from moving away from the fixing member 10 and stops the stage adjusting mechanism 20 (or the central shaft 31) from rotating with the same part.

Third, in the second embodiment, a positioning member 80 is provided and tends to abut against the stage adjusting mechanism 20 (or the central shaft 31), such that the central shaft 31 tends to be positioned at the specific rotation angle. Preferably, the stage adjusting mechanism 20 (or the central shaft 31) has multiple positioning portions 22, each of which is preferably formed as a recess, for working along with the positioning member 80, such that the stepless adjustable electronic device locking apparatus of the present invention can be adjusted in the way similar to stepped.

In the second embodiment of the present invention, the adjustment of the working stages and the movement of the fixing member 10 are also separate. Therefore, the fixing member 10 can be closed to unlock quickly by operating the unlocking member 50. Since the working stage does not have to be changed, the fixing member 10 can be used to engage in the anti-theft hole of the same size directly. The working stage does not have to be adjusted, which is convenient to use.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A stepless adjustable electronic device locking apparatus configured to secure an electronic device that has an anti-theft hole, and the electronic device locking apparatus comprising:

a fixing member configured to be inserted in the anti-theft hole of the electronic device;

a stage adjusting mechanism being operable to adjust working stages of the fixing member;

a driving mechanism connected with the fixing member and the stage adjusting mechanism, and selectively opening the fixing member to engage in the anti-theft hole based on a current one of the working stages to which the stage adjusting mechanism adjusts;

an unlocking member connected to the driving mechanism and being movable to an unlocking position to close the fixing member, so as to make the fixing member disengage from the anti-theft hole; and a lock, wherein when the lock is locked, the stage adjusting mechanism is fixed at the current one of the working stages by the lock, and the unlocking member is incapable of being moved to the unlocking position, wherein the driving mechanism includes a central shaft tending to move toward the fixing member;

movement of the central shaft toward the fixing member makes the fixing member opened to engage in the anti-theft hole based on the current one of the working stages to which the stage adjusting mechanism adjusts;

the unlocking member is connected with the central shaft;

when the unlocking member is moved to the unlocking position, the unlocking member drives the central shaft to move away from the fixing member; and the unlocking member has a threaded hole, the central shaft is mounted through and screwed in the threaded hole, and the stage adjusting mechanism drives the central shaft to rotate relative to the unlocking member.

2. The stepless adjustable electronic device locking apparatus as claimed in claim 1, wherein when the central shaft of the driving mechanism is moved toward the fixing member, the central shaft pushes the fixing member to open the fixing member to engage in the anti-theft hole based on the current one of the working stages to which the stage adjusting mechanism adjusts.

3. The stepless adjustable electronic device locking apparatus as claimed in claim 1, wherein the lock has a retractable engaging member abutting against the unlocking member or the central shaft; and when the lock is locked, the engaging member is non-retractable to stop the unlocking member from moving to the unlocking position.

4. The stepless adjustable electronic device locking apparatus as claimed in claim 1, wherein the lock has a retractable engaging member;

when the unlocking member is located at the unlocking position, the engaging member engages with the unlocking member or the central shaft;

when the lock is locked, the engaging member is non-retractable to make the unlocking member fixed at the unlocking position.

5. The stepless adjustable electronic device locking apparatus as claimed in claim 1, wherein when the unlocking member is located at the unlocking position and the lock is locked, the unlocking member is fixed at the unlocking position by the lock.

6. The stepless adjustable electronic device locking apparatus as claimed in claim 1, wherein the driving mechanism includes a central shaft resilient element pushing the central shaft to move toward the fixing member.

7. The stepless adjustable electronic device locking apparatus as claimed in claim 1, wherein the stage adjusting mechanism adjusts the working stages through rotation, and the stage adjusting mechanism or the driving mechanism includes multiple rotating-stopping portions;

the lock has a retractable engaging member tending to engage with one of the rotating-stopping portions; and when the lock is locked, the engaging member is non-retractable to stop the stage adjusting mechanism or the driving mechanism from rotating.

8. The stepless adjustable electronic device locking apparatus as claimed in claim 1, wherein the stage adjusting mechanism adjusts the working stages through rotation; and the stepless adjustable electronic device locking apparatus further comprises a positioning member tending to abut against the stage adjusting mechanism or the driving mechanism, such that the stage adjusting mechanism or the driving mechanism tends to be positioned at a specific rotation angle.

* * * * *